United States Patent
Dassanayake et al.

(10) Patent No.: US 8,393,737 B2
(45) Date of Patent: Mar. 12, 2013

(54) LIGHT ENGINE USING COMMON BUILDING BLOCKS

(75) Inventors: Mahendra S. Dassanayake, Bloomfield Hills, MI (US); Donald P. Bilger, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 13/039,560

(22) Filed: Mar. 3, 2011

(65) Prior Publication Data

US 2012/0224151 A1 Sep. 6, 2012

(51) Int. Cl.
- *G03B 21/26* (2006.01)
- *G03B 21/28* (2006.01)
- *G02B 5/30* (2006.01)
- *G02B 27/14* (2006.01)
- *G02B 27/28* (2006.01)
- *G02B 27/12* (2006.01)

(52) U.S. Cl. ............... 353/33; 353/94; 353/81; 353/99; 359/485.06; 359/489.09; 359/638; 359/640; 372/100

(58) Field of Classification Search ........... 353/33, 353/94, 81, 98–99; 359/485.06, 489.09, 359/638, 640; 372/100

See application file for complete search history.

(56) References Cited

U.S. PATENT DOCUMENTS

| | | | |
|---|---|---|---|
| 5,760,964 A | 6/1998 | Malik | |
| 6,345,895 B1 | 2/2002 | Maki et al. | |
| 7,224,531 B2 * | 5/2007 | Ho et al. | 359/634 |
| 7,325,956 B2 | 2/2008 | Morejon et al. | |
| 7,508,591 B2 | 3/2009 | Pinho | |
| 2008/0151196 A1 | 6/2008 | Kinoshita | |

FOREIGN PATENT DOCUMENTS

EP 0883020 B1 9/1998

OTHER PUBLICATIONS

Dichroic Color Mirrors, Optics Balzers AG, Jan. 2009, 2 pages.
LED ColorDichroics™, Optics Balzers AG, Jan. 2009, 2 pages.
ColorWedge™, Optics Balzers AG, Jan. 2009, 2 pages.

* cited by examiner

*Primary Examiner* — Georgia Y Epps
*Assistant Examiner* — Magda Cruz
(74) *Attorney, Agent, or Firm* — Frank MacKenzie; MacMillan, Sobanski & Todd LLC

(57) ABSTRACT

A light engine combines light of first, second, and third color ranges using three pentagonal prism elements. Each prism has first and second diagonal surfaces. Each first diagonal surface has a first dichroic treatment and each second diagonal surface has a second dichroic treatment. The prisms are arranged with the first diagonal surface of the first prism juxtaposed with one diagonal surface of the third prism and with the second diagonal surface of the second prism juxtaposed with the other diagonal surface of the third prism. A first light beam of the first color is reflected at a right angle by the first diagonal surfaces, and a second light beam is reflected at a right angle by the second diagonal surfaces. A third light beam of the third color passes unreflected through the surfaces to produce a combined light beam or common output light path.

10 Claims, 4 Drawing Sheets

LIGHT ENGINE USING COMMON BUILDING BLOCKS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to a light combiner for image projection systems, and, more specifically, to a multi-prism system for directing colored light sources along a common output light path.

Various types of video projection systems are in common use today. An imaging device such as a Digital Light Processor (DLP) or Liquid Crystal on Silicon (LCOS) device are illuminated by and selectably modify light according to an instantaneous frame of a video image. To keep the size, weight, and cost of such projectors to such a minimum, the video projection system usually uses only a single imaging device while producing a color image. The device is sequentially illuminated with red, green, and blue portions of the image. This mode of operation is called field-sequential color. The illumination source or light engine for this type of color video projector includes separate red, green, and blue light sources that are turned on individually during the appropriate portion of a video frame. In order to use a single image forming device, the separate colors must illuminate the image device along the same light path leading to the device.

Light engines using red, green, and blue light emitting diodes (LEDs) on a single common substrate generally suffer from efficiency and/or color uniformity problems. For example, the individual LED dice may be difficult to locate in an optimum position relative to the collimating optics. Known light engines using separately-positioned sources for each color of light generally use a system of dichroic mirrors to combine the light outputs of the separate sources. Known mirror systems are large and expensive, and it has not been possible to efficiently integrate them in a compact, low-cost light engine.

SUMMARY OF THE INVENTION

In one aspect of the invention, a light engine is provided for aligning light of a first color range, a second color range, and a third color range. First and second pentagonal prism elements each have a substantially rectangular base portion and a is substantially triangular prism portion, wherein each prism portion has first and second diagonal surfaces. Each first diagonal surface has a first dichroic treatment for reflecting light within the first color range and passing light within the second and third color ranges. Each second diagonal surface has a second dichroic treatment for reflecting light within the second color range and passing light within the first and third color ranges. A third pentagonal prism element has a substantially rectangular base portion and a substantially triangular prism portion with first and second diagonal surfaces, wherein each diagonal surface passes light within the third color range. The prism elements are arranged with their prism portions abutting so that the first diagonal surface of the first prism element is juxtaposed with one diagonal surface of the third prism element and the second diagonal surface of the second prism element is juxtaposed with the other diagonal surface of the third prism element.

A first light source with a first light beam of the first color range is arranged to direct the first light beam through the base portion of the first prism element into the prism portion thereof. A second light source with a second light beam of the second color range is arranged to direct the second light beam through the base portion of the second prism element into the prism portion thereof. A third light source with a third light beam of the third color range is arranged to direct the third light beam through the base portion of the third prism element into the prism portion thereof. The first light beam is reflected substantially at a right angle by the first diagonal surfaces of the first prism element and the second prism element. The second light beam is reflected substantially at a right angle by the second diagonal surfaces of the first prism element and the second prism element. The third light beam passes substantially unreflected through the first, second, and third prism elements to produce a common output light path.

DETAILED DESCRIPTION OF PREFERRED EMBODIMENTS

The present invention uses a combination of micro-optics, molded plastic light guides, and dichroic surfaces or coatings to deliver a compact, low-cost, efficient light engine. In one embodiment, separate red, green, and blue LEDs with Lambertian emission patterns are used as the sources for red, green, and blue light. Light from each LED is collimated in a separate molded plastic part with a micro-optic collimation pattern on the side closest to the LED. Prism surfaces on the other side of the plastic part have an optimum reflection angle and are provided with dichroic surfaces having transmission and reflection properties tailored to the colors from the LED light sources. These prism elements are brought together with a collector/diffuser element which is also a molded plastic part and has an optical micro-structure molded into the part for diffusing an exiting light beam to a desired f-number.

By appropriately selecting the dichroic properties and the arrangement of the LEDs, the invention uses a common building block for the molded plastic prism used to receive the light from each LED. For economy of scale, a commonized part with dichroic treatments for just two of the three colors can be used for all three collimating/reflecting functions of the optics. In such an embodiment, some of the dichroic surfaces do not perform a useful function but they also do not interfere with the desired propagation of the colored light.

Instead of LEDs, laser sources can alternatively be used. With laser sources, the micro-optic collimation pattern for the incident beam on each prism element may not be required. Furthermore, LEDs with emission patterns other than Lambertian can also be used.

Figure 1:
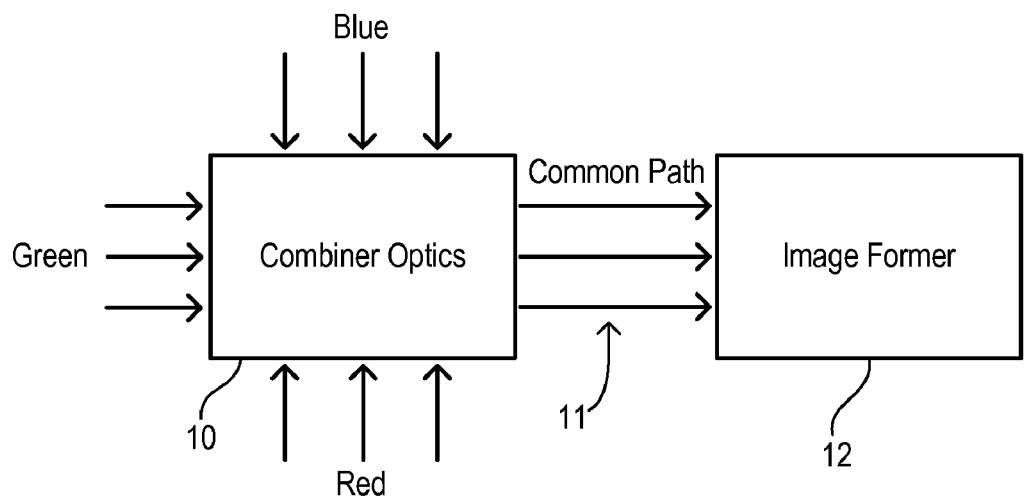
FIG. 1 is a block diagram of an image forming system using combined is light from colored sources.

Referring now to FIG. 1, combiner optics 10 receives light from separate red, green, and blue sources. Optics 10 generates a single light output path 11 directed into an image former 12. The common path allows image former 12 to separately process the different red, green, and blue portions of each video frame. Alternatively, the light sources could be illuminated simultaneously if it is desired to generate a white light output along the common light path.

Figure 2:
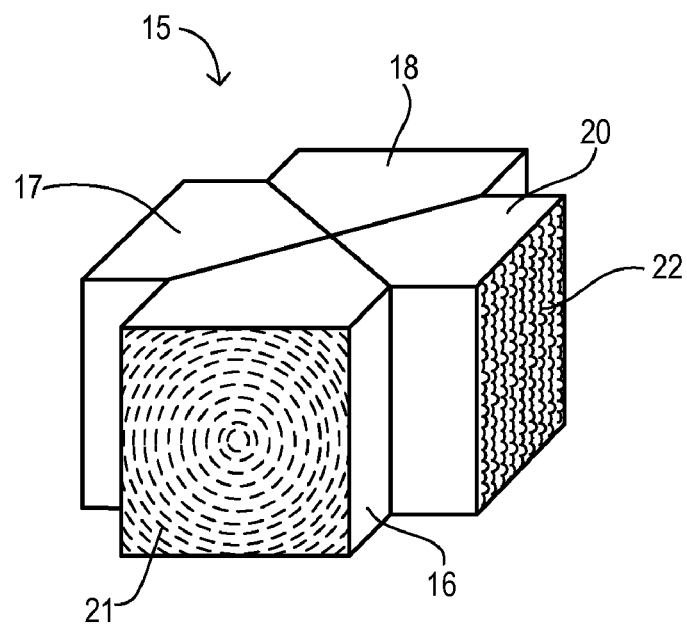
FIG. 2 is a perspective view of one preferred embodiment of a prism assembly of the invention.

FIG. 2 shows a prism assembly 15 utilizing common building blocks to achieve a low-cost, compact combiner for the light engine. First, second, and third pentagonal prism elements 16, 17, and 18 receive light from respective colored sources. Each prism element 16-18 may preferably include a micro-optical collimating surface treatment 21 on their light input surfaces. The light output surfaces of elements 16-18 are joined together within the assembly 15 along with the input surfaces of a diffusion element 20. The output surface of element 20 may preferably include a micro-optic diffusion surface 22 to provide uniformity of the color intensity across the output of the exiting light beam.

Figure 3:
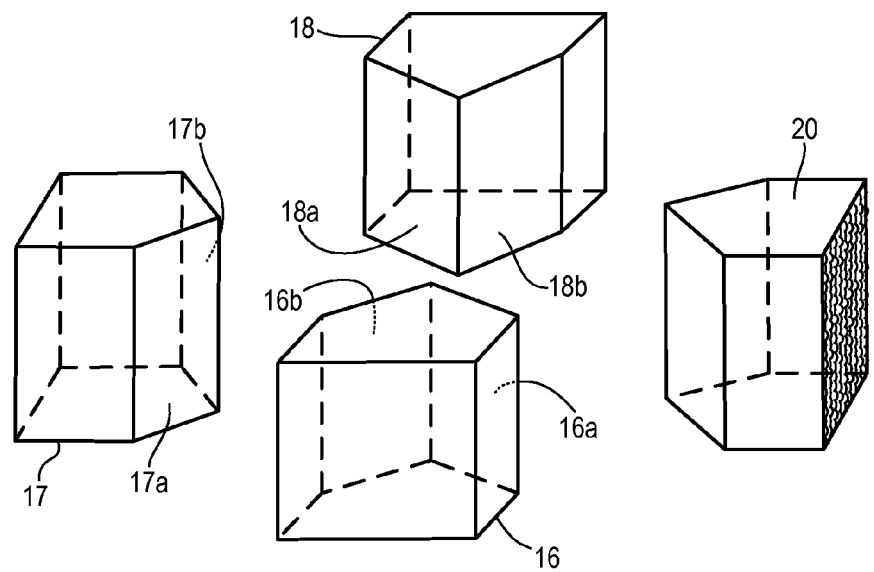
FIG. 3 is an exploded view of the prism assembly of FIG. 2.

FIG. 3 shows the prism elements with the assembly exploded. The elements have diagonal surfaces which abut one another to form a cross. The diagonal surfaces of at least elements 16 and 18 are provided with dichroic surfaces. Thus, element 16 has diagonal surfaces 16a and 16b with dichroic surface treatments for reflecting light within particular color ranges. Element 18 has diagonal surfaces 18a and 18b, each with dichroic surface treatments for reflecting light in the same two color ranges. Prism element 17 has diagonal surfaces 17a and 17b which may include the same dichroic surface treatments in order to reduce parts count for manufacturing the light engine, or alternatively may not include any dichroic treatment.

Figure 4:
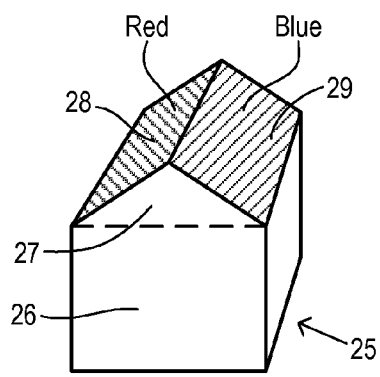
FIG. 4 is a perspective view showing the diagonal surfaces of a prism element.

A single pentagonal prism element 25 is shown in FIG. 4 including a rectangular base portion 26 and a triangular prism portion 27. Preferably, base portion 26 and triangular prism portion 27 are integrally formed as a molded plastic component using known plastic materials with good optical performance. Although base portion 26 is shown as rectangular with a certain thickness of the light path through base portion 26 to prism portion 27, it is not necessary to provide such a thickness. Thus, the present invention includes a base portion which may be comprised of no more than the bottom surface of triangular prism portion 27.

Figure 5:
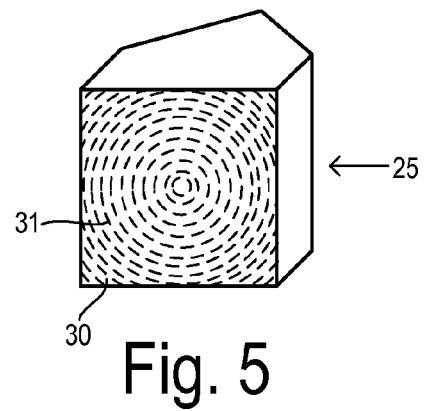
FIG. 5 is a perspective view showing the collimating surface of a prism element.

Prism portion 27 has a first diagonal surface 28 and second diagonal surface 29. Diagonal surface 28 has a first dichroic treatment for reflecting light within a first color range (in this example red) while passing light within the two other color ranges (i.e., green and blue). Second diagonal surface 29 has a second dichroic treatment for reflecting light within the blue color range and passing light within the red and green color ranges. As shown in FIG. 5, an input face 30 of base portion 26 may preferably include a collimating surface treatment 31. A known micro-optic surface pattern may be created by the mold tools when a prism element is molded, or may be applied afterwards with known patterning techniques.

Dichroic coatings for reflecting light of predetermined color while passing other colors are known in the art. See, for example, U.S. Pat. No. 7,508,591 to Pinho, issued Mar. 24, 2009. Color dichroic coatings can be obtained from Optics Balzers AG of Liechtenstein, for example. Red and blue dichroic mirrors are preferred since it simplifies the ability of a prism element to pass the remaining color of intermediate wavelength (i.e., green) with minimal attenuation since it is in the passband of both dichroic treatments.

When assembled into the light engine, prism elements on opposite transverse sides are used to input the red and blue light and to reflect it in a common direction. Thus, the same molded part with one red-reflective and one blue-reflective dichroic surface is used for both elements, but with one element vertically flipped with respect to the other so that their red-reflective surfaces are coplanar and their blue-reflective surfaces are coplanar.

Figure 6:
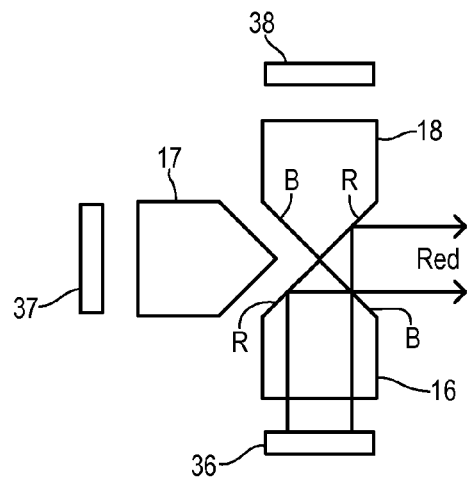
FIG. 6 is a partially exploded view of the prism elements showing the reflection path of red light.

FIG. 6 illustrates the reflection of red light obtained by the prism elements. A red LED 36 illuminates the base portion of prism element 16. The red light passes through the base portion into the triangular prism portion and is reflected at a right angle by the first dichroic treatment (red-reflective) on the first diagonal surface of element 16. Red light passes out through the second diagonal surface of element 16 without being reflected since the dichroic treatment on the second diagonal surface reflects blue light and passes through red light. However, the passed light then encounters the first diagonal surface of prism element 18 with its red-reflective dichroic treatment. Thus, all the red light is reflected at an optimum angle (e.g., a right angle) onto an output light path. Prism element 20 is not shown in FIG. 6, but it would typically be present in order to provide a desired diffusion and f-number for the output light path. In FIG. 6, prism element 17 is shown backed away from the other prism elements in order to better illustrate the light reflecting surfaces, but it would preferably be abutting the other prism elements.

Figure 7:
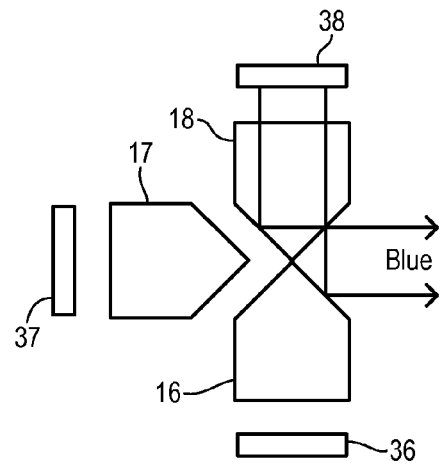
FIG. 7 is a partially exploded view of the prism elements showing the reflection path of blue light.
Figure 8:
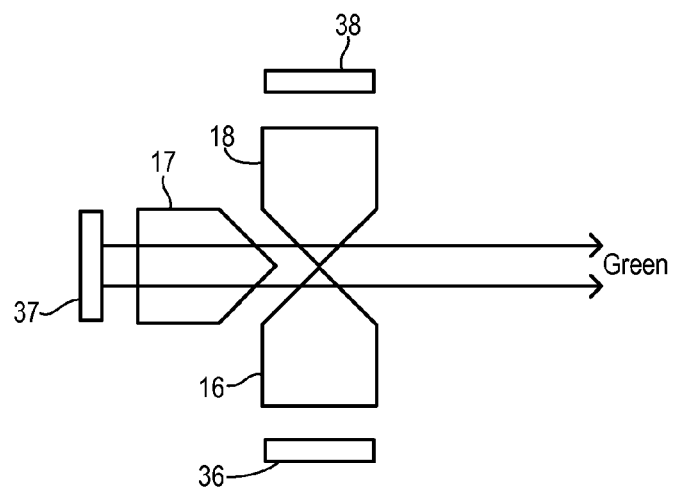
FIG. 8 is a partially exploded view of the prism elements showing the path of green light.

FIG. 7 shows a blue light source 38 illuminating the base portion of prism element 18 and the resulting reflection of the blue light onto the common light output path. FIG. 8 shows the light output path of green light produced by a green light source 37 through prism elements 17, 16, and 18. Since the red and blue dichroic treatments would not affect the green light, the commonized part can be used for element 17 without affecting the light output. Alternatively, a prism element 17 without any treatments on the diagonal surfaces could be used. This would result in an increased part count, but could save on the cost of the surface treatments.

Figure 9:
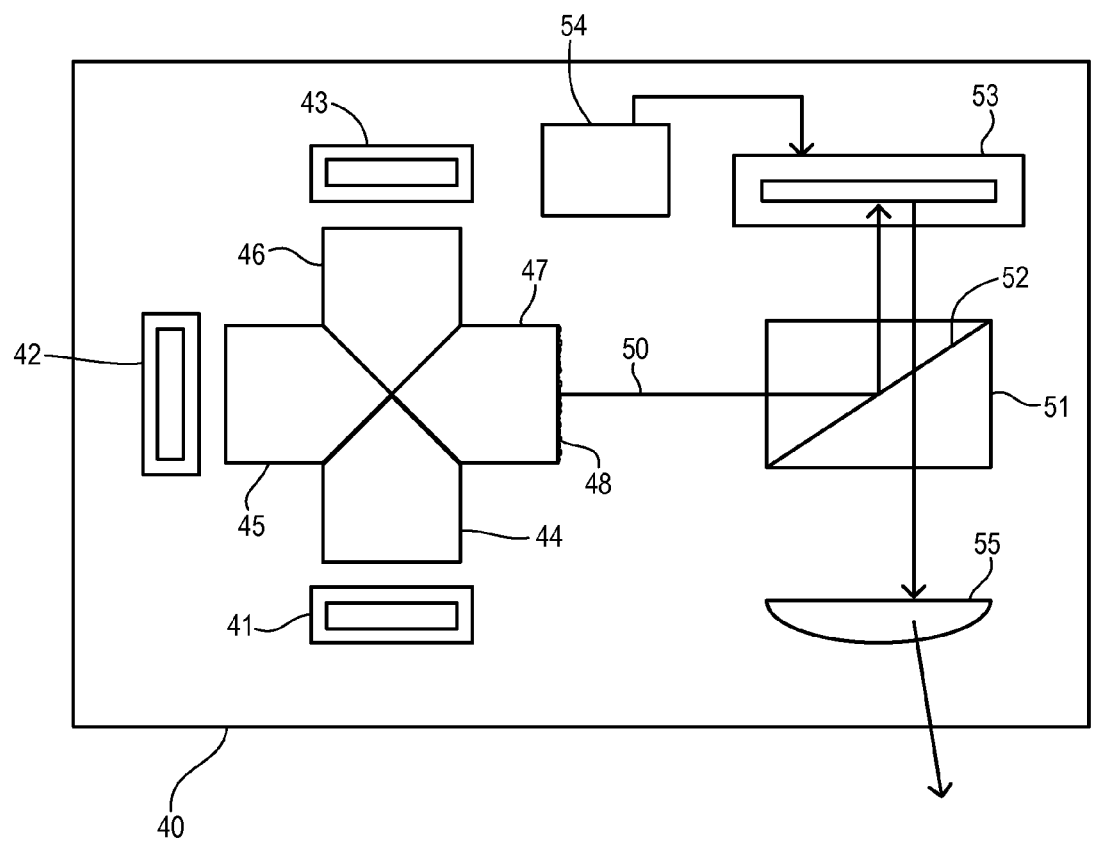
FIG. 9 is a schematic diagram of an embodiment of an image projection system with a light engine according to the present invention.

FIG. 9 shows a circuit board 40 having components mounted thereon for a video projection system. A red LED 41, a green LED 42, and a blue LED 43 illuminate prism elements 44, 45, and 46, respectively. The diagonal surfaces of elements 44-46 have respective dichroic treatments for reflecting red and blue color ranges as previously described. A diffusing element 47 has a color diffusing or mixing surface 48 so that the light engine provides a common output light path 50 which is directed to a corner cube 51 with an internal surface 52 that redirects the light from the light engine to an image former 53. Image former 53 includes a backing mirror and is connected to a controller 54. Image formed 53 may comprise a pixilated LCD device for selectively attenuating the red, green, or blue light according to corresponding portions of the image frame to be projected. The formed image returns to corner cube 51 and passes through corner cube 51 to a projection lens 55.

What is claimed is:

1. A light engine apparatus for aligning light of a first color range, a second color range, and a third color range, comprising:

first and second pentagonal prism elements each having a substantially rectangular base portion and a substantially triangular prism portion, wherein each prism portion has first and second diagonal surfaces, wherein each first diagonal surface has a first dichroic treatment for reflecting light within the first color range and passing light within the second and third color ranges, wherein each second diagonal surface has a second dichroic treatment for reflecting light within the second color range and passing light within the first and third color ranges;

a third pentagonal prism element having a substantially rectangular base portion and a substantially triangular prism portion with first and second diagonal surfaces, wherein each diagonal surface passes light within the third color range, and wherein the prism elements are arranged with their prism portions abutting so that the first diagonal surface of the first prism element is juxtaposed with one diagonal surface of the third prism element and the second diagonal surface of the second prism element is juxtaposed with the other diagonal surface of the third prism element;

a first light source with a first light beam of the first color range arranged to direct the first light beam through the base portion of the first prism element into the prism portion thereof;

a second light source with a second light beam of the second color range arranged to direct the second light beam through the base portion of the second prism element into the prism portion thereof; and a third light source with a third light beam of the third color range arranged to direct the third light beam through the base portion of the third prism element into the prism portion thereof;

wherein the first light beam is reflected substantially at a right angle by the first diagonal surfaces of the first prism element and the second prism element, wherein the second light beam is reflected substantially at a right angle by the second diagonal surfaces of the first prism element and the second prism element, and wherein the third light beam passes substantially unreflected through the first, second, and third prism elements to produce a common output light path.

2. The apparatus of claim 1 wherein each base portion has a collimating surface treatment.

3. The apparatus of claim 1 further comprising:

a fourth pentagonal prism element having a substantially rectangular base portion and a substantially triangular prism portion with first and second diagonal surfaces abutting the second diagonal surface of the first prism element and the first diagonal surface of the second prism element, wherein the base portion of the fourth prism element has a color-diffusing surface treatment.

4. The apparatus of claim 1 wherein the third prism element has the first dichroic treatment on the first diagonal surface thereof and has the second dichroic treatment on the second diagonal surface thereof, whereby the first, second, and third prism elements are substantially identical components.

5. The apparatus of claim 4 wherein each base portion has a collimating surface treatment.

6. The apparatus of claim 1 wherein the base portion and the triangular prism portion of each pentagonal prism element is integrally formed as a molded plastic component.

7. The apparatus of claim 6 wherein each dichroic treatment is comprised of a respective dichroic coating.

8. The apparatus of claim 1 wherein the first, second, and third light sources are each comprised of an LED.

9. The apparatus of claim 1 wherein the first, second, and third light sources are each comprised of a laser source.

10. The apparatus of claim 1 wherein the first color range is characterized by blue light, wherein the second color range is characterized by red light, and wherein the third color range is characterized by green light.

* * * * *